(12) United States Patent
Furukubo et al.

(10) Patent No.: US 6,755,081 B2
(45) Date of Patent: Jun. 29, 2004

(54) ACCELERATION SENSOR

(75) Inventors: Eiichi Furukubo, Kadoma (JP); Masami Hori, Hirakata (JP); Kazuya Nohara, Katano (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/333,910

(22) PCT Filed: Jul. 12, 2002

(86) PCT No.: PCT/JP02/07085
§ 371 (c)(1),
(2), (4) Date: Apr. 30, 2003

(87) PCT Pub. No.: WO03/007000
PCT Pub. Date: Jan. 23, 2003

(65) Prior Publication Data
US 2003/0183004 A1 Oct. 2, 2003

(30) Foreign Application Priority Data
Jul. 13, 2001 (JP) ........................ 2001-214032

(51) Int. Cl.⁷ ................................ G01P 1/02
(52) U.S. Cl. ........................................ 73/493
(58) Field of Search ............... 73/514.16, 514.29, 73/514.33, 514.36, 514.37, 493, 431, 866.5, 777, 778; 338/2, 5; 310/329; 361/748, 731, 760, 765, 768, 773, 784, 792, 796

(56) References Cited

U.S. PATENT DOCUMENTS

| | | | |
|---|---|---|---|
| 5,503,016 A | | 4/1996 | Koen |
| 5,554,806 A | | 9/1996 | Mizuno et al. |
| 5,616,863 A | | 4/1997 | Koen |
| 5,942,685 A | * | 8/1999 | Tabota .......................... 73/493 |
| 6,060,780 A | | 5/2000 | Ohta et al. |
| 6,112,594 A | * | 9/2000 | Brinks et al. .................. 73/493 |
| 6,115,261 A | * | 9/2000 | Platt et al. .................... 361/760 |

FOREIGN PATENT DOCUMENTS

| | | |
|---|---|---|
| DE | 19521712 | 12/1995 |
| JP | 8-94663 | 4/1996 |
| JP | 9-292408 | 11/1997 |
| JP | 10-73615 | 3/1998 |

* cited by examiner

Primary Examiner—Helen Kwok
(74) Attorney, Agent, or Firm—Greenblum & Bernstein P.L.C.

(57) ABSTRACT

An acceleration sensor including a sensor chip for converting into an electrical signal an acceleration applied in a direction of a sensitive axis parallel to a board face of a printed circuit board, which has a first wire bonding face, a wiring base for supporting the sensor chip, which includes second and third wire bonding faces and a wiring pattern formed on the second and third wire bonding faces and a package for accommodating the wiring base having the sensor chip mounted thereon, which has a mounting face to be mounted on the board face of the printed circuit board and a fourth wire bonding face substantially parallel to the mounting face such that the wiring pattern on the third and second wire bonding faces of the wiring base can be connected to pads of the package and pads of the sensor chip, respectively.

15 Claims, 12 Drawing Sheets

ACCELERATION SENSOR

TECHNICAL FIELD

The present invention relates to an acceleration sensor for use in a motor vehicle, an aircraft, a household electrical appliance or the like.

BACKGROUND ART

FIGS. 19 and 20 are a side sectional view and a front elevational view of a conventional acceleration sensor, respectively. The conventional acceleration sensor includes a sensor chip 101 for converting into an electrical signal an acceleration applied in a direction of a sensitive axis X parallel to a board face BF of a printed circuit board 110, an IC chip 103 acting as a processing circuit for processing the electrical signal of the sensor chip 101, an oblique spacer 102 for supporting the sensor chip 101 and a package 104 for accommodating the IC chip 103 and the oblique spacer 102 having the sensor chip 101 mounted thereon. The package 104 is of a shape of a rectangular box and has at its underside a mounting face MF to be mounted on the board face BF of the printed circuit board 110. The mounting face MF of the package 104 is provided on one of outer faces of the rectangular box, which has a minimum area in the outer faces. A plurality of terminals 106 for transmitting signals between outside and the sensor chip 101 and the IC chip 103 are provided at a lower portion of each of front and rear faces of the package 104 so as to be secured to the board face BF of the printed circuit board 110 by solder 111 such that the mounting face MF of the package 104 is mounted on the board face BF of the printed circuit board 110.

Meanwhile, an opening formed on the front face of the package 104 is covered by a cap 105. Pads 112 of the sensor chip 101 and pads 114 of the IC chip 103 are, respectively, connected by bonding wires 109 to pads 113 formed on an inner face of the package 104 and pads 115 formed on the inner face of the package 104. Furthermore, a wiring pattern 107 is provided for connecting the pads 113 and 115 and the terminals 106.

As shown in FIGS. 21 and 22, the conventional sensor chip 101 has a so-called cantilever construction including a first substrate 120 formed by a semiconductor substrate and a second substrate 130 joined to a rear face of the first substrate 120. As best shown in FIG. 23, the first substrate 120 is formed with a weight portion 123, a deflective portion 122 which is formed on a principal surface of the first substrate 120 and has one end coupled integrally with the weight portion 123, a support portion 121 for pivotally supporting the weight portion 123 via the deflective portion 122, which is integrally coupled with the other end of the deflective portion 122 and a piezoresistance portion 124 disposed at the deflective portion 122. The piezoresistance portion 124 acts as a sensing element for detecting a deformation of the deflective portion 122 so as to convert a degree of the deformation of the deflective portion 122 into an electrical signal representing an acceleration. Meanwhile, a reference numeral "125" in FIGS. 21 and 22 denotes a stopper. By deflection of the deflective portion 122 upon application of an acceleration to the sensor chip 101, the piezoresistance portion 124 is also deflected so as to change its resistance value, so that an electrical signal corresponding to the resistance value is outputted as the acceleration.

As shown in FIG. 23, the sensor chip 101 of the cantilever construction should be inclined at an angle θ relative to a perpendicular on the board face BF of the printed circuit board 110 such that a straight line connecting a fulcrum B of deflection of the deflective portion 122 and a center C of gravity of the weight portion 123 is perpendicular to the sensitive axis X, i.e., a direction of application of the acceleration. If this angle θ is not correct, the deflective portion 122 is deflected even when the acceleration is 0 G, so that off-axis sensitivity of the acceleration sensor increases, thereby resulting in an erroneous output of the acceleration sensor. The oblique spacer 102 supports the sensor chip 101 so as to define this angle θ of inclination of the sensor chip 101.

Meanwhile, the sensor chip 101 may also have a so-called fixed beam construction in which opposite ends of the weight portion 123 are, respectively, fixed by a pair of the support portions 121 through a pair of the deflective portions 122. In this case, since the angle θ in FIG. 23 is zero, the principal surface of the sensor chip 101 is perpendicular to the sensitive axis Z.

In the conventional acceleration sensor referred to above, the sensitive axis X is substantially perpendicular to the principal surface of the sensor chip 101. Hence, in case an acceleration parallel to the board face BF of the printed circuit board 110 is detected by the conventional acceleration sensor, the mounting face MF of the package 104 having a shape of a rectangular box should be provided on one of outer faces of the rectangular box, which has a minimum area in the outer faces, so that undesirable inclination of the package 104 due to its inaccurate mounting is likely to become large and thus, such a disadvantage may be incurred that off-axis sensitivity of the acceleration sensor becomes large due to inaccurate parallelism between the sensitive axis X and the board face BF of the printed circuit board 110.

Meanwhile, as shown in FIG. 19, the package 104 is formed by a multi-layer ceramic package in which ceramic plates 104a to 104e are laminated on each other such that lamination faces of the ceramic plates 104a to 104e are perpendicular to the board face BF of the printed circuit board 110. Since a ceramic sheet is split into the ceramic plates 104a to 104e by using a break method which is an inexpensive method for splitting the ceramic sheet into a plurality of ceramic plates each having a desired size, burrs are formed on end faces and side faces of the package 104, which are split faces of the ceramic plates 104a to 104e, so that it is difficult to obtain accurate flatness of the package 104 and thus, undesirable inclination of the package 104 due to its inaccurate mounting is apt to become large, thereby resulting in such a problem that off-axis sensitivity of the acceleration sensor becomes large.

Furthermore, in case the package 104 is formed by the multi-layer ceramic package, a planar conductive pattern having such a size as to enable wire bonding can be formed only on faces of the package 104 parallel to the lamination faces of the ceramic plates 104a to 104e. Here, if the sensor chip 101 has a cantilever construction in which the principal surface, i.e., a wire bonding face of the sensor chip 101 is not perpendicular to the sensitive axis X as described above, the wire bonding face for the pads 112 in the sensor chip 101 and a wire bonding face for the pads 113 in the package 104 are not parallel to each other, so that wire bonding of the pads 112 and 113 should be performed between the wire bonding faces of the sensor chip 101 and the package 104, which are not parallel to each other and thus, such an inconvenience is encountered that it is difficult to secure reliability of wire bonding of the pads 112 and 113.

DISCLOSURE OF INVENTION

The present invention has for its object to provide, with a view to eliminating the above mentioned drawbacks of prior art, an acceleration sensor in which by lessening undesirable inclination of a sensor chip due to its inaccurate mounting, off-axis sensitivity of the acceleration sensor is reduced and reliability of wire bonding portions is secured.

In order to accomplish this object of the present invention, an acceleration sensor according to the present invention includes a sensor chip for converting into an electrical signal an acceleration applied in a direction of a sensitive axis parallel to a board face of a printed circuit board, which has a first wire bonding face. A wiring base supports the sensor chip and includes second and third wire bonding faces and a wiring pattern formed on the second and third wire bonding faces. A package accommodates the wiring base having the sensor chip mounted thereon and has a mounting face to be mounted on the board face of the printed circuit board and a fourth wire bonding face substantially parallel to the mounting face. The wiring base is mounted on the package such that a difference between heights of the third and fourth wire bonding faces from the board face of the printed circuit board and an angle formed between the third and fourth wire bonding faces are set to small values enabling the wiring pattern on the third wire bonding face of the wiring base to be connected to pads on the fourth wire bonding face of the package. The sensor chip is mounted on the wiring base such that the wiring pattern on the second wire bonding face of the wiring base can be connected to pads on the first wire bonding face of the sensor chip.

BEST MODE FOR CARRYING OUT THE INVENTION

Figure 1:
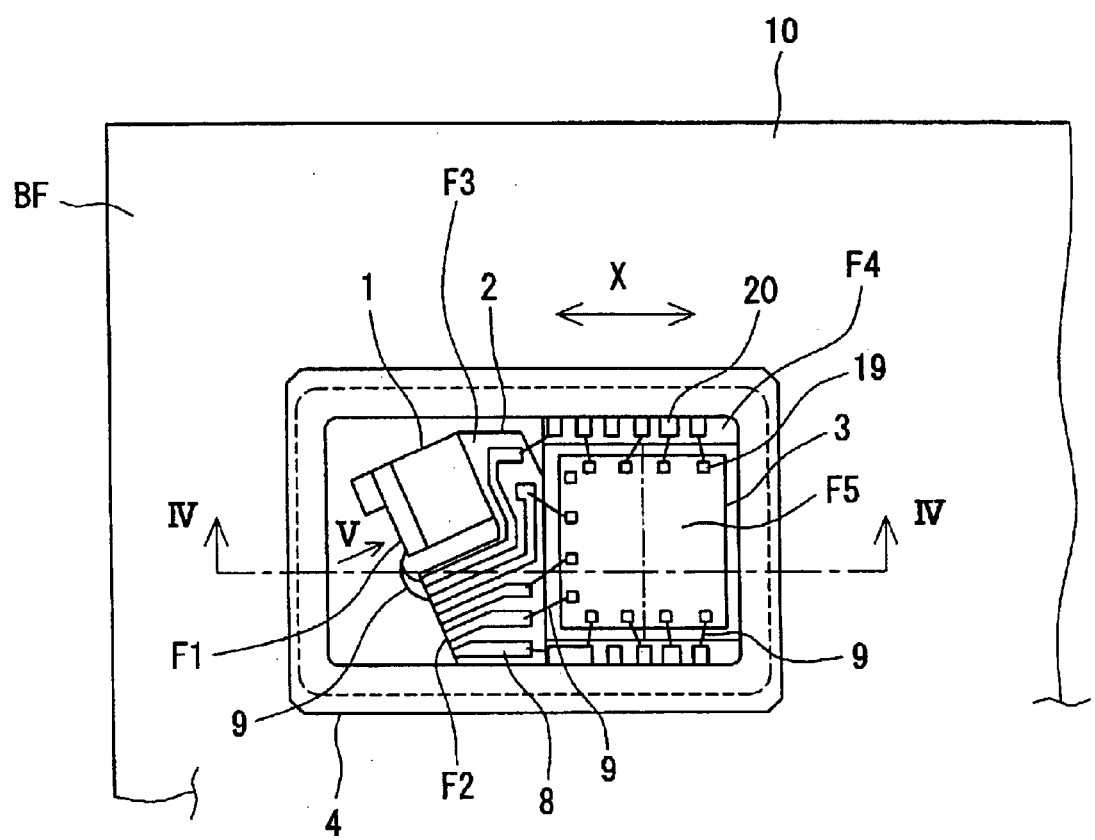
FIG. 1 is a top plan view of an acceleration sensor according to a first embodiment of the present invention.

Hereinafter, embodiments of the present invention are described with reference to the drawings.

(First embodiment)

FIGS. 1 to 8 show an acceleration sensor according to a first embodiment of the present invention. As shown in FIGS. 1 to 4, the acceleration sensor includes a sensor chip 1 for converting into an electrical signal an acceleration applied in a direction of a sensitive axis X parallel to a board face BF of a printed circuit board 10, an IC chip 3 acting as a processing circuit for processing the electrical signal of the sensor chip 1, a wiring base 2 for supporting the sensor chip 1 and a package 4 for accommodating the IC chip 3 and the wiring base 2 having the sensor chip 1 mounted thereon. The package 4 is of a shape of a rectangular box and has at its underside a mounting face MF to be mounted on the board face BF of the printed circuit board 10. The mounting face MF of the package 4 is provided on one of outer faces of the rectangular box other than a specific outer face having a minimum area in the outer faces.

Figure 2:
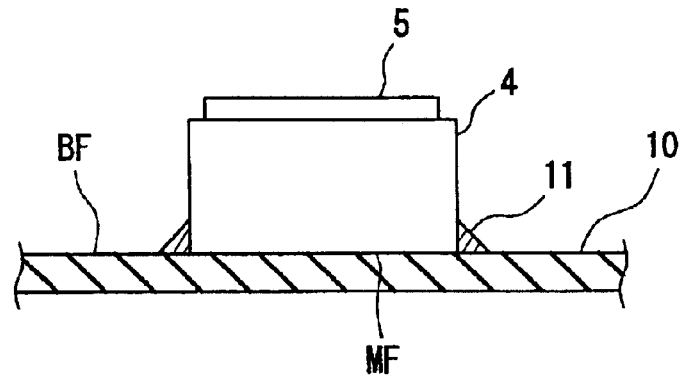
FIG. 2 is a side elevational view of the acceleration sensor of FIG. 1.
Figure 3:
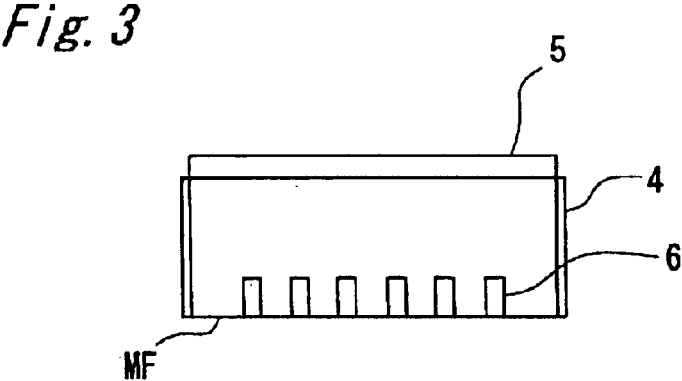
FIG. 3 is a front elevational view of the acceleration sensor of FIG. 1.
Figure 4:
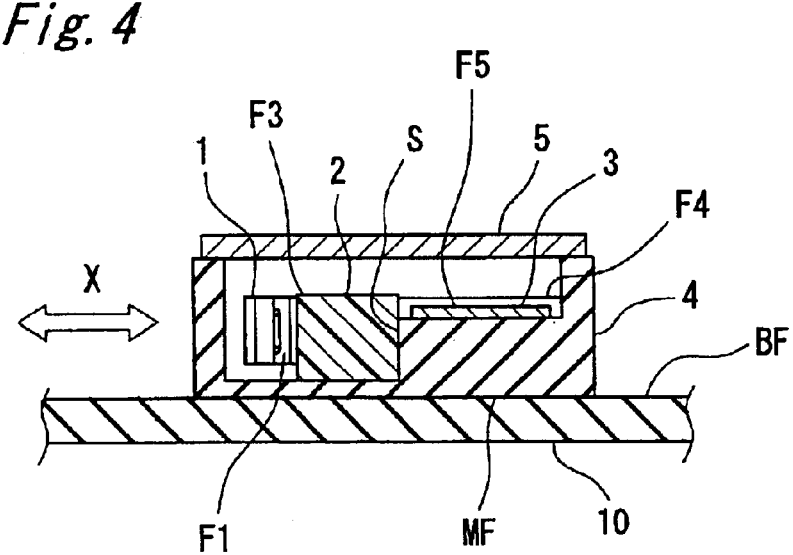
FIG. 4 is a sectional view taken along the line IV—IV in FIG. 1.
Figure 5:
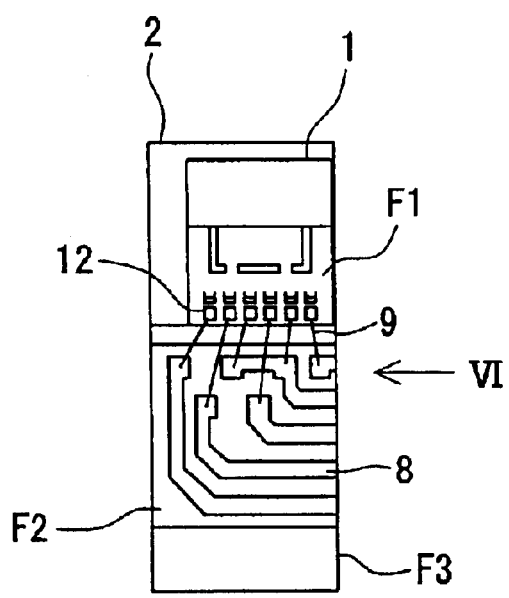
FIG. 5 is a view as observed in the direction of the arrow V in FIG. 1.
Figure 6:
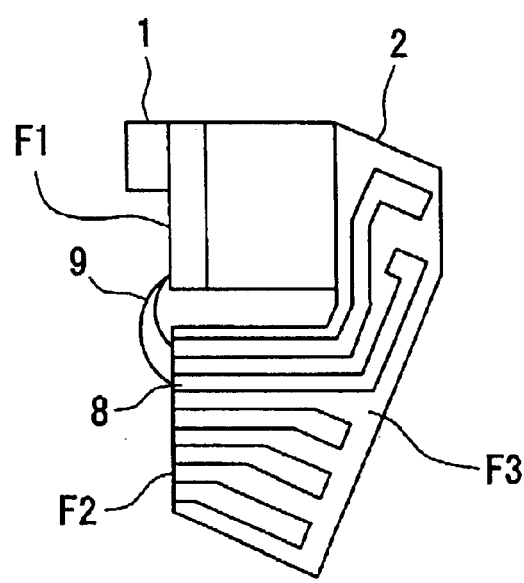
FIG. 6 is a view as observed in the direction of the arrow VI in FIG. 5.

The wiring base 2 is formed by a molded interconnection device (MID) of resinous material and includes a wiring pattern (conductive pattern) 8 for connecting the sensor chip 1 and the IC chip 3 as shown in FIGS. 1, 5 and 6. As shown in FIGS. 2 and 3, a plurality of terminals 6 for transmitting signals between outside and the sensor chip 1 and the IC chip 3 are provided at a lower portion of each of front and rear faces of the package 4 so as to be secured to the board face BF of the printed circuit board 10 by solder 11 such that the mounting face MF of the package 4 is mounted on the board face BF of the printed circuit board 10. As shown in FIG. 4, an opening formed on an upper face of the package 4 is covered by a cap 5. It is to be noted here that all positional indications such as "upper", "lower", etc. relate to the illustration in FIGS. 2 to 4, hereinafter.

As shown in FIGS. 5 and 6, pads 12 are formed on a first wire bonding face F1 of the sensor chip 1, while the wiring pattern 8 is formed on second and third wire bonding faces F2 and F3 of the wiring base 2. As shown in FIG. 1, pads 20 are formed on a fourth wire bonding face F4 of the package 4, while pads 19 are formed on a fifth wire bonding face F5 of the IC chip 3. By using bonding wires 9, the wiring pattern 8 on the second wire bonding face F2 of the wiring base 2 is connected to the pads 12 of the sensor chip 1 as shown in FIG. 5, while not only the wiring pattern 8 on the third wire bonding face F3 of the wiring base 2 is connected to the pads 20 of the package 4 and the pads 19 of the IC chip 3 but the pads 19 of the IC chip 3 are connected to the pads 20 of the package 4 as shown in FIG. 1. The wiring pattern 8 on the third wire bonding face F3 of the wiring base 2 may also be connected to the pads 20 of the package 4 by conductive paste or solder.

As shown in FIG. 4, the package 4 has a stepped bottom wall including a lower step portion and an upper step portion. A vertical positioning surface S for positioning the wiring base 2 is defined by a side face of the upper step portion of the package 4. A side face of the wiring base 2 is brought into contact with the positioning surface S such that the wiring base 2 is positioned on an upper face of the lower step portion of the package 4. Meanwhile, the IC chip 3 is provided on a recessed upper face of the upper step portion of the package 4.

Figure 7:
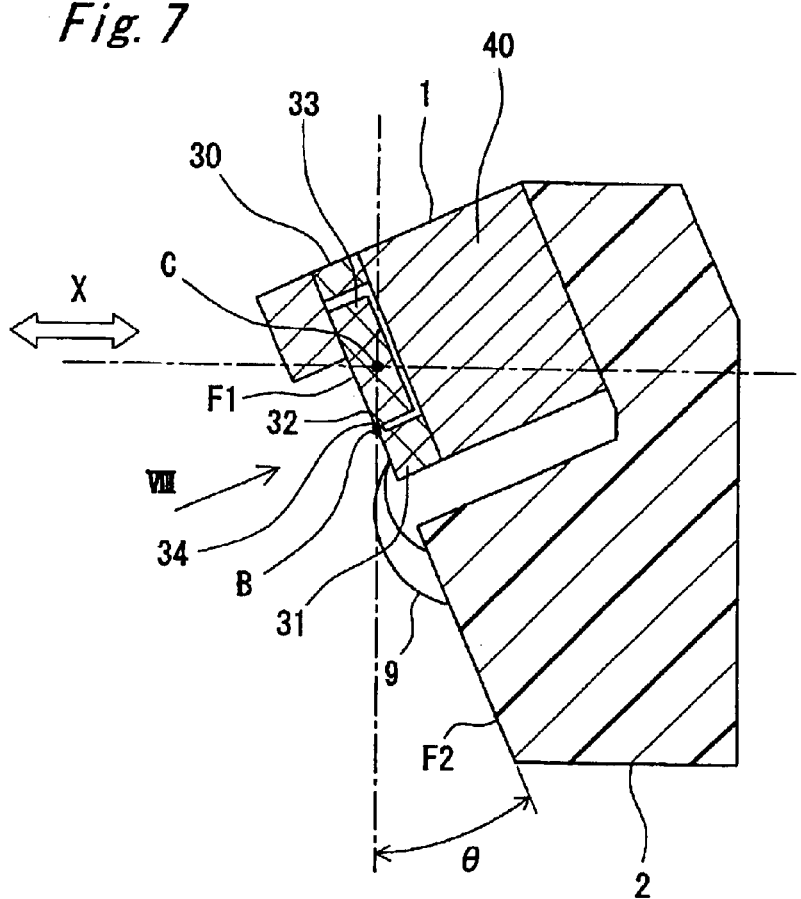
FIG. 7 is an enlarged fragmentary horizontal sectional view of FIG. 1.
Figure 8:
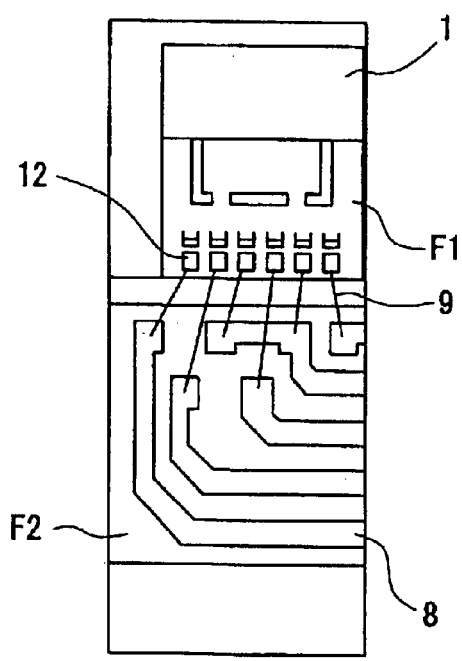
FIG. 8 is an enlarged view as observed in the direction of the arrow VII in FIG. 7.

As shown in FIGS. 7 and 8, the sensor chip 1 includes a first substrate 30 formed by a semiconductor substrate and having the first wire bonding face F1 and a second substrate 40 joined to a rear face of the first substrate 30 and has a cantilever construction in which the first substrate 30 is formed with a weight portion 33, a deflective portion 32, a support portion 31 and a piezoresistance portion 34 such that the first wire bonding face F1 of the sensor chip 1 is not perpendicular to the sensitive axis X. The piezoresistance portion 34 is disposed at the deflective portion 32 and acts as a sensing element for detecting a deformation of the deflective portion 32 so as to convert a degree of the deformation of the deflective portion 32 into an electrical signal representing the acceleration. The deflective portion 32 is formed on the first wire bonding surface F1 of the first substrate 30 and has one end coupled integrally with the weight portion 33. The support portion 31 is integrally coupled with the other end of the deflective portion 32 so as to pivotally support the weight portion 33 via the deflective portion 32. The sensor chip 1 is supported by the wiring base 2 such that a straight line connecting a fulcrum B of deflection of the deflective portion 32 and a center C of gravity of the weight portion 33 is perpendicular to the sensitive axis X and parallel to the board face BF of the printed circuit board 10, namely, a cantilever formed by the support portion 31, the deflective portion 32 and the weight portion 33 is parallel to the board face BF of the printed circuit board 10.

The wiring base 2 is mounted on the package 4 such that a difference between heights of the third and fourth wire bonding faces F3 and F4 from the board face BF of the printed circuit board 10 and an angle formed between the third and fourth wire bonding faces F3 and F4 are set to small values enabling the wiring pattern 8 on the third wire bonding face F3 of the wiring base 2 to be connected to the pads 20 on the fourth wire bonding face F4 of the package 4. In this embodiment as shown in FIG. 4, the third wire bonding face F3 of the wiring base 2 and the fourth wire bonding face F4 of the package 4 are substantially flush with each other and are parallel to each other. Moreover, the fourth wire bonding face F4 of the package 4 and the fifth wire bonding face F5 of the IC chip 3 are substantially flush with each other and are parallel to each other.

Meanwhile, the sensor chip 1 is mounted on the wiring base 2 such that the wiring pattern 8 on the second wire bonding face F2 of the wiring base 2 can be connected to the pads 12 on the first wire bonding face F1 of the sensor chip 1. In this embodiment as shown in FIGS. 5 and 6, the first wire bonding face F1 of the sensor chip 1 and the second wire bonding face F2 of the wiring base 2 are flush with each other and parallel to each other.

Therefore, even in case the first wire bonding face F1 of the sensor chip 1 is not parallel to the fourth wire bonding face F4 of the package 4 and the fifth wire bonding face F5 of the IC chip 3, the second and third wire bonding faces F2 and F3 of the wiring base 2 enable stable wire bonding among the sensor chip 1, the package 4 and the IC chip 3 by making neighboring two of the first to fifth wire bonding faces F1 to F5 parallel to each other and substantially flush with each other. In this embodiment, the first wire bonding face F1 of the sensor chip 1 is not parallel to the fourth wire bonding face F4 of the package 4 and the fifth wire bonding face F5 of the IC chip 3 but the wiring base 2 has the second wire bonding face F2 parallel to the first wire bonding face F1 of the sensor chip 1 and the third wire bonding face F3 parallel to the fourth wire bonding face F4 of the package 4 and the fifth wire bonding face F5 of the IC chip 3, so that wire bonding can be performed highly reliably between the neighboring parallel two of the first to fifth wire bonding faces F1 to F5.

Figure 20:
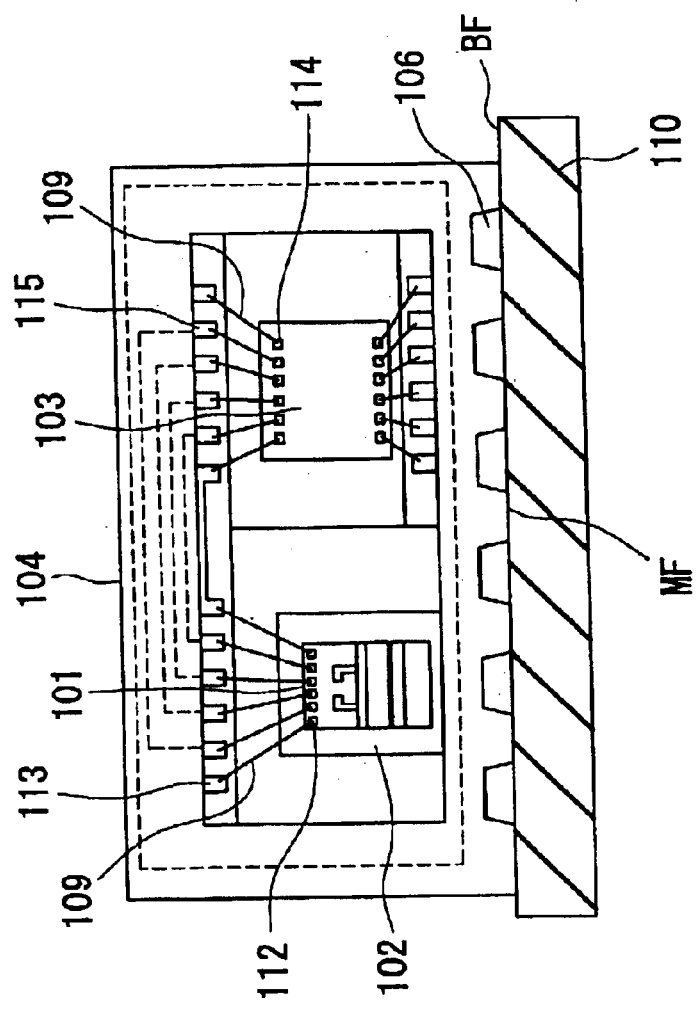
FIG. 20 is a front elevational view of the prior art acceleration sensor of FIG. 19.
Figure 19:
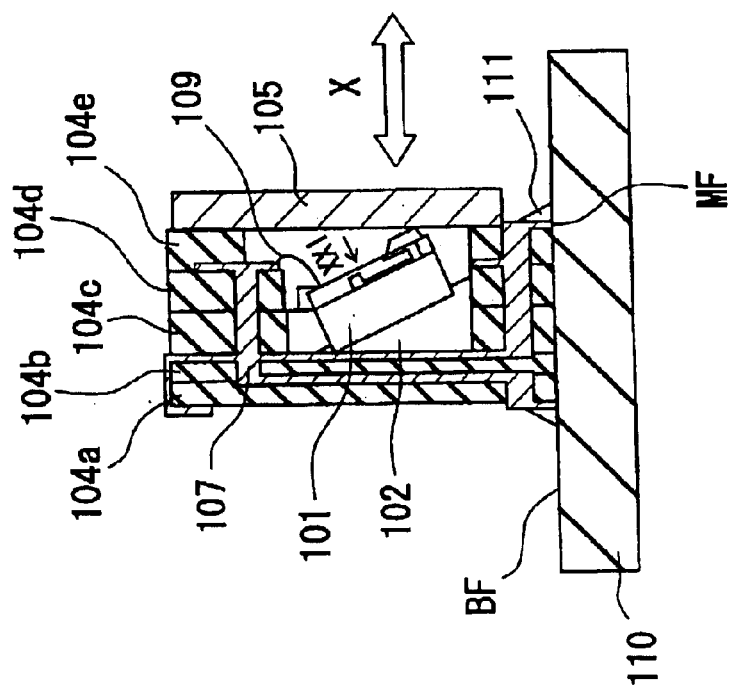
FIG. 19 is a side sectional view of a prior art acceleration sensor.
Figure 21:
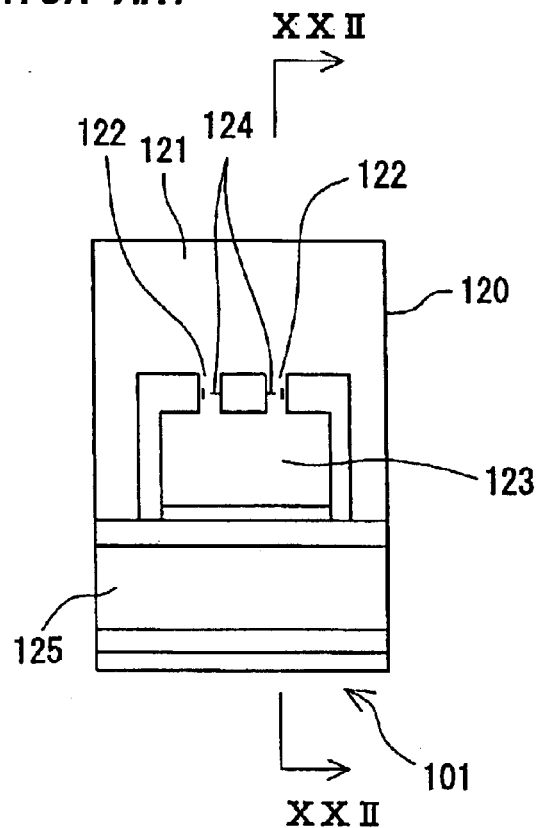
FIG. 21 is an enlarged view as observed in the direction of the arrow XXI in FIG. 19.
Figure 22:
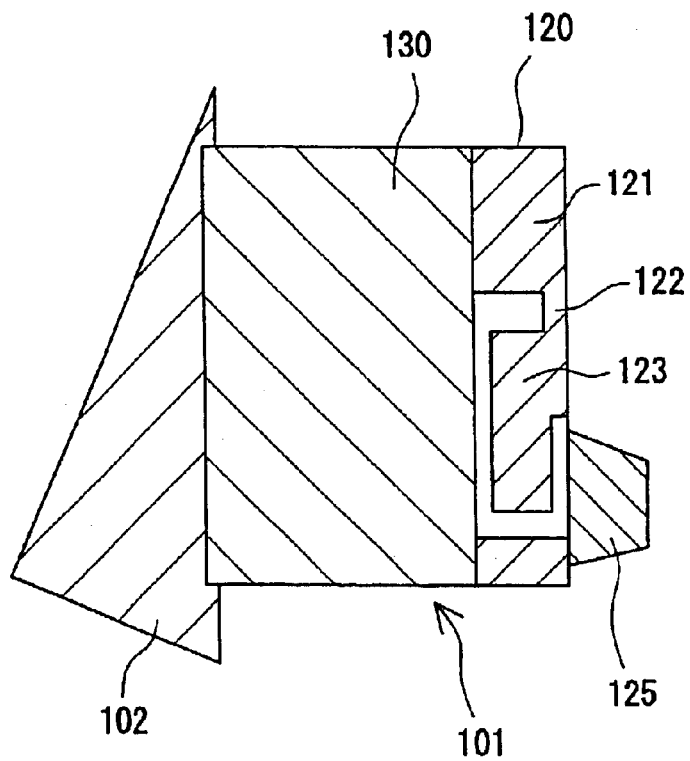
FIG. 22 is an enlarged sectional view taken along the line XXII—XXII in FIG. 21.
Figure 23:
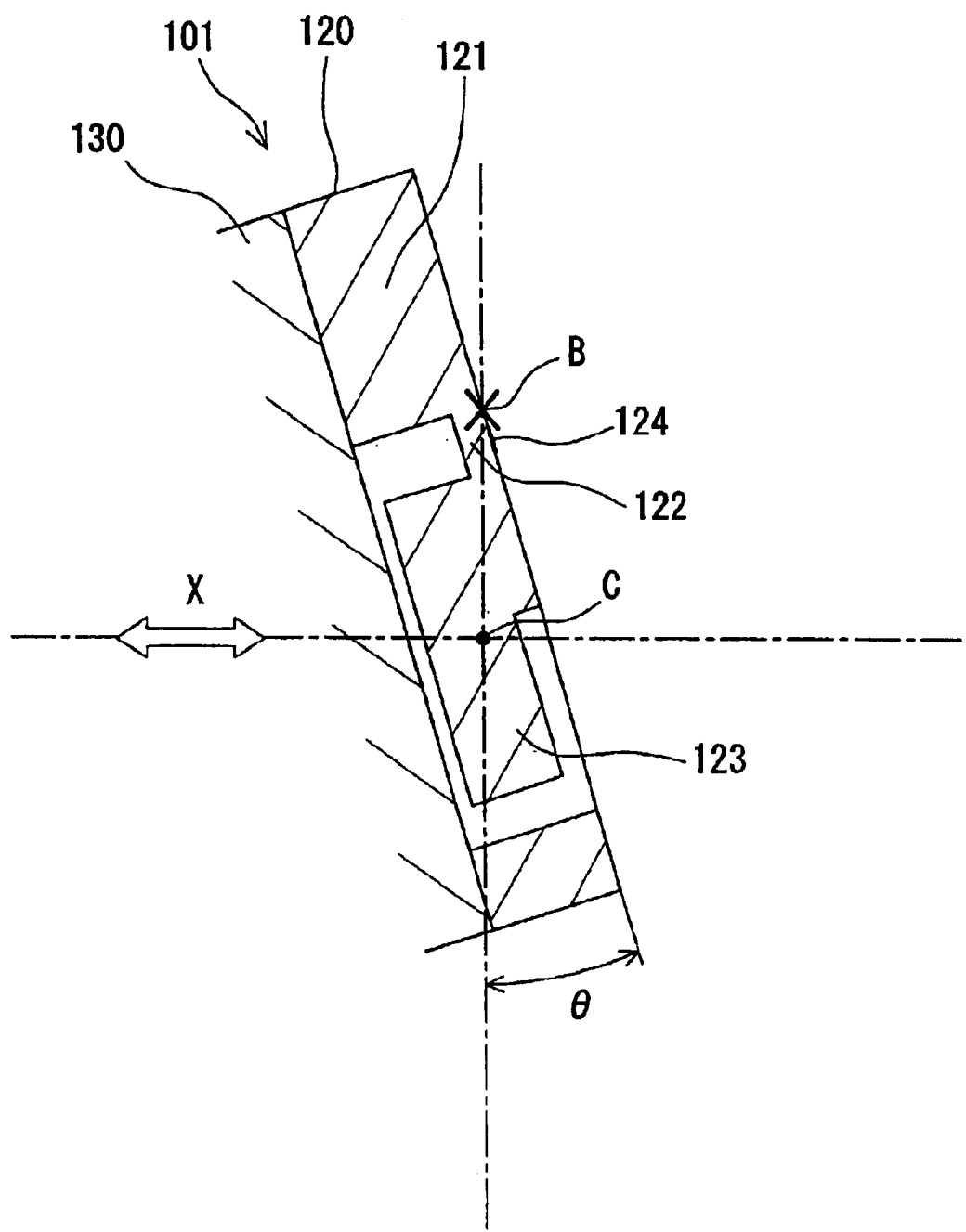
FIG. 23 is an enlarged fragmentary sectional view of a sensor chip employed in the prior art acceleration sensor of FIG. 19.

In a known acceleration sensor shown in FIGS. 19 and 20, a sensitive axis X is substantially perpendicular to a wire bonding face of a sensor chip 101. Therefore, in order to make the sensitive axis X parallel to a board face BF of a printed circuit board 110 in the known acceleration sensor, a mounting face MF of a package 104 having a shape of a rectangular box should be provided on one of outer faces of the rectangular box, which has a minimum area in the outer faces.

However, in this embodiment, since the first wire bonding face F1 of the sensor chip 1 is not required to be parallel to the fourth wire bonding face F4 of the package 4 and the fifth wire bonding face F5 of the IC chip 3, which are parallel to the board face BF of the printed circuit board 10, the first wire bonding face F1 of the sensor chip 1 is not required to be parallel to the board face BF of the printed circuit board 10. Hence, as shown in FIG. 1, the first wire bonding face F1 of the sensor chip 1 is set to be perpendicular to the board face BF of the printed circuit board 10. Therefore, the mounting face MF of the package 4 having a shape of a rectangular box can be provided on one of outer faces of the rectangular box other than a specific outer face having a minimum area in the outer faces, so that undesirable inclination of the sensor chip 1 due to its inaccurate mounting is lessened and thus, off-axis sensitivity of the acceleration sensor can be reduced.

Furthermore, since the wiring base 2 is formed by the molded interconnection device (MID) of resinous material, the wiring base 2 can be molded highly accurately by raising accuracy of a molding die, so that undesirable inclination of the sensor chip 1 due to its inaccurate mounting is further lessened and thus, off-axis sensitivity of the acceleration sensor can be further reduced. Meanwhile, the package 4 is formed by a molded item of resinous or ceramic material and is formed, on its surface, with the pads 20 and a wiring pattern.

The wiring base 2 may also be made of ceramic or glass. In this case, since a coefficient of thermal expansion of the wiring base 2 is similar to that of silicon which forms the sensor chip 1 and the IC chip 3, thermal stress applied between the wiring base 2 and the sensor chip 1 and the IC chip 3 is reduced and thus, operational reliability of the acceleration sensor can be secured.

Figure 9:
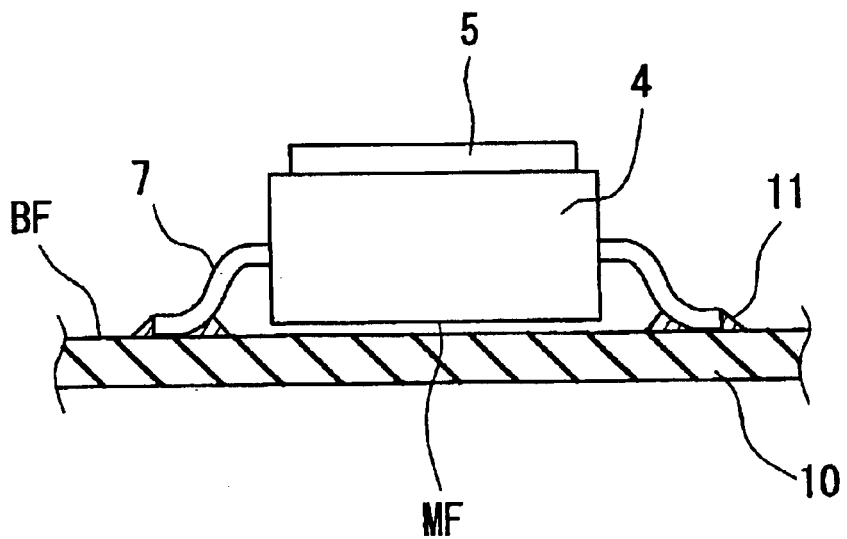
FIG. 9 is a view similar to FIG. 2, particularly showing a modification of the acceleration sensor of FIG. 1.

FIG. 9 shows an acceleration sensor which is a modification of the acceleration sensor of FIG. 1. In this acceleration sensor, a plurality of curved leads 7 are employed in place of the terminals 6 of the acceleration sensor of FIG. 1 and curved bent portions of the leads 7 serve to relax stress of the solder 11 so as to secure reliability of the solder 11.

(Second Embodiment)

Figure 10:
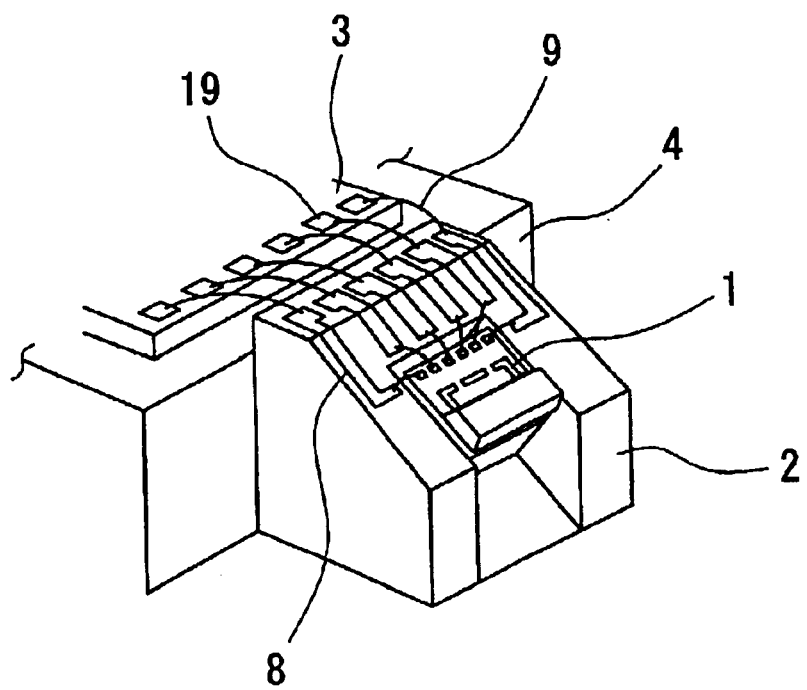
FIG. 10 is a fragmentary perspective view of an acceleration sensor according to a second embodiment of the present invention.
Figure 11:
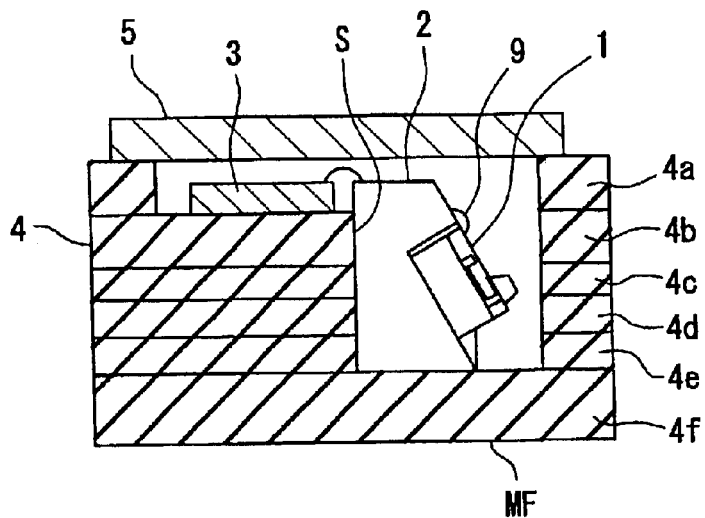
FIG. 11 is a fragmentary vertical sectional view of the acceleration sensor of FIG. 10.
Figure 12:
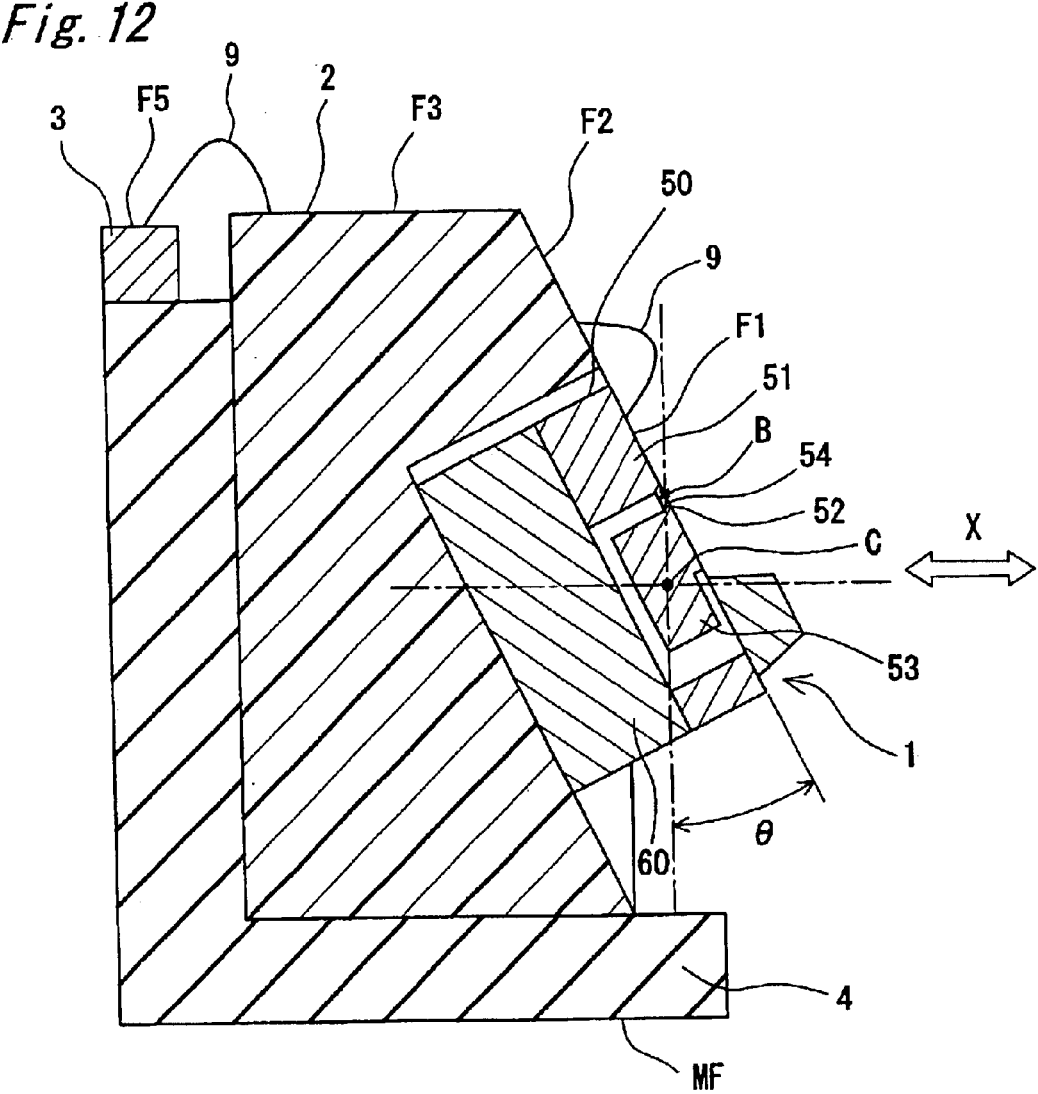
FIG. 12 is an enlarged fragmentary vertical sectional view of FIG. 11.

FIGS. 10 to 12 show an acceleration sensor according to a second embodiment of the present invention.

As shown in FIG. 12, the sensor chip 1 includes a first substrate 50 formed by a semiconductor substrate and having the first wire bonding face F1 and a second substrate 60 joined to a rear face of the first substrate 50 and has a cantilever construction in which the first substrate 50 is formed with a support portion 51, a deflective portion 52, a weight portion 53 and a piezoresistance portion 54 such that the first wire bonding face F1 of the sensor chip 1 is not perpendicular to sensitive axis X in the same manner as the acceleration sensor of FIG. 1. The piezoresistance portion 54 is disposed at the deflective portion 52 and acts as a sensing element for detecting a deformation of the deflective portion 52 so as to convert a degree of the deformation of the deflective portion 52 into an electrical signal representing an acceleration. The deflective portion 52 is formed on the first wire bonding surface F1 of the first substrate 50 and has one end coupled integrally with the weight portion 53. The support portion 51 is integrally coupled with the other end of the deflective portion 52 so as to pivotally support the weight portion 53 via the deflective portion 52. In this embodiment, the sensor chip 1 is supported by the wiring base 2 such that a straight line connecting a fulcrum B of deflection of the deflective portion 52 and a center C of gravity of the weight portion 53 is perpendicular to not only the sensitive axis X in the same manner as the first embodiment but the board face BF of the printed circuit board 10 in contrast with the first embodiment. Furthermore, as shown in FIG. 11, the package 4 is formed by a multi-layer ceramic package in which ceramic plates 4a to 4f are laminated on each other such that lamination faces of the ceramic plates 4e to 4f are parallel to the board face BF of the printed circuit board 10. Since other constructions of the acceleration sensor are similar to those of the acceleration sensor of the first embodiment, the description is abbreviated for the sake of brevity.

Since the sensor chip 1 is supported by the wiring base 2 such that the straight line connecting the fulcrum B of deflection of the deflective portion 52 and the center C of gravity of the weight portion 53 is perpendicular to the board face BF of the printed circuit board 10 as described above, stress distribution of the deflective portion 52 and the support portion 51 is symmetrical with respect to the straight line connecting the fulcrum B of deflection of the deflective portion 52 and the center C of gravity of the weight portion 53, so that off-axis sensitivity of the acceleration sensor is lessened and thus, operational reliability of the acceleration sensor is raised.

The package 4 has a shape of a rectangular box and the ceramic plate 4f has the mounting face MF as shown in FIG. 11. The mounting face MF of the package 4 is provided on one of outer faces of the rectangular box other than a specific outer face having a minimum area in the outer faces. Since the lamination faces of the ceramic pates 4a to 4f have highly accurate parallelism and flatness, undesirable inclination of the sensor chip 1 due to its inaccurate mounting is reduced and thus, off-axis sensitivity of the acceleration sensor can be lessened. The package 4 has a stepped bottom wall including a lower step portion formed by the ceramic plate 4f and an upper step portion formed by the ceramic plates 4b to 4e. A vertical positioning surface S for positioning the wiring base 2 is defined by side faces of the ceramic plates 4b to 4e. A side face of the wiring base 2 is brought into contact with the positioning surface S such that the wiring base 2 is positioned on an upper face of the lower step portion of the package 4. Meanwhile, the IC chip 3 is provided on an upper face of the upper step portion of the package 4.

Since the cap 5 is made of ceramic, the cap 5 has a coefficient of thermal expansion equal to that of the package 4 made of ceramic, so that reliability of sealing between the package 4 and the cap 5 can be secured. Meanwhile, the cap 5 may also be made of metal such as covar, 42 alloy or the like. In this case, since a difference in coefficient of thermal expansion between the cap 5 and the package 4 made of ceramic is small, reliability of sealing between the package 4 and the cap 5 can be secured and noise shielding performance between the package 4 and the cap 5 can be upgraded.

Figure 13:
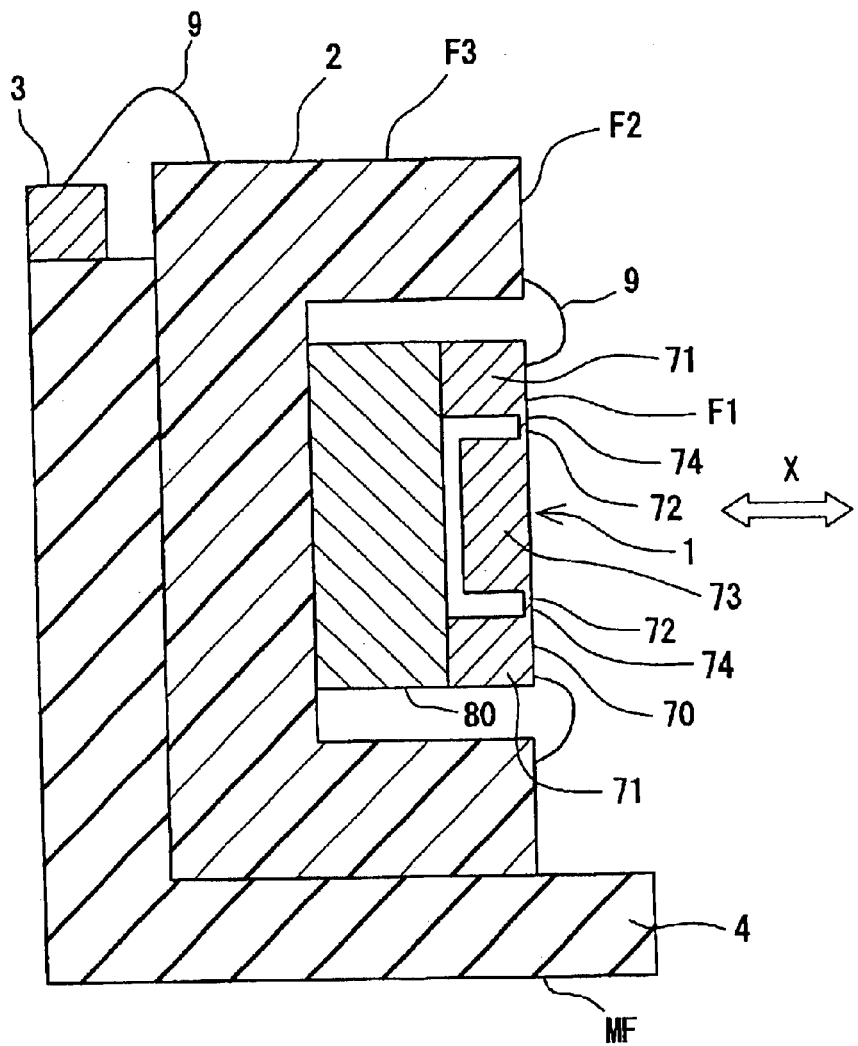
FIG. 13 is a view similar to FIG. 12, particularly showing a modification of the acceleration sensor of FIG. 10.

FIG. 13 shows an acceleration sensor which is a modification of the acceleration sensor of FIG. 10. In this acceleration sensor, the sensor chip 1 includes a first substrate 70 formed by a semiconductor substrate and having the first wire bonding face F1 and a second substrate 80 joined to a rear face of the first substrate 70 and has a fixed beam construction in which opposite ends of a weight portion 73 are, respectively, fixed by a pair of support portions 71 through a pair of deflective portions 72 in the first substrate 70. A piezoresistance portion 74 is disposed on the first wire bonding face F1 at the deflective portion 72 and acts as a sensing element for detecting a deformation of the deflective portion 72 so as to convert a degree of the deformation of the deflective portion 72 into an electrical signal representing an acceleration. The sensor chip 1 is supported by the wiring base 2 such that the first wire bonding face F1 of the sensor chip 1 is perpendicular to sensitive axis X, i.e., the board face BF of the printed circuit board 10.

(Third Embodiment)

Figure 14:
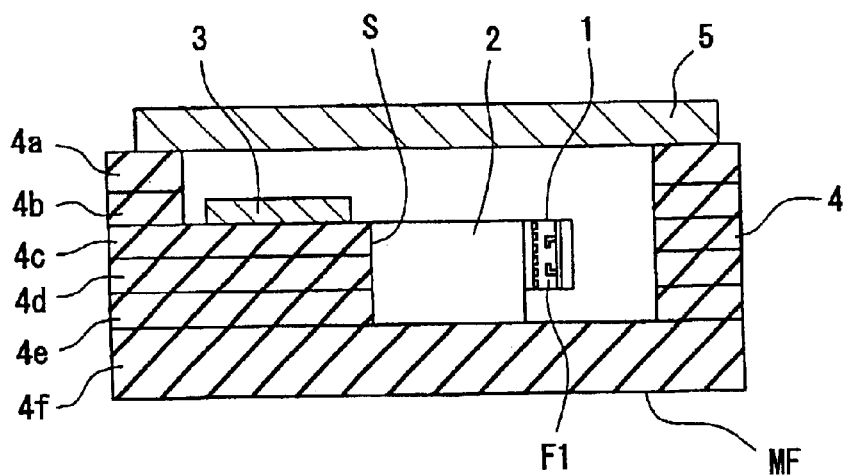
FIG. 14 is a fragmentary vertical sectional view of an acceleration sensor according to a third embodiment of the present invention.

FIG. 14 shows an acceleration sensor according to a third embodiment of the present invention. In the acceleration sensor, the sensor chip 1 has the same cantilever construction as that of the acceleration sensor of FIG. 1. Therefore, the acceleration sensor of FIG. 14 has the arrangement of FIG. 7 in which the first wire bonding face F1 of the sensor chip 1 is not perpendicular to the sensitive axis X and the straight line connecting the fulcrum B of deflection of the deflective portion 32 and the center C of gravity of the weight portion 33 is perpendicular to the sensitive axis X and parallel to the board face BF of the printed circuit board 10, namely, the cantilever formed by the support portion 31, the deflective portion 32 and the weight portion 33 is parallel to the board face BF of the printed circuit board 10.

In FIG. 14, the package 4 is formed by a multi-layer ceramic package in which ceramic plates 4a to 4f are laminated on each other such that lamination faces of the ceramic plates 4e to 4f are parallel to the board face BF of the printed circuit board 10. The package 4 has a stepped bottom wall including a lower step portion formed by the ceramic plate 4f and an upper step portion formed by the ceramic plates 4c to 4e. A vertical positioning surface S for positioning the wiring base 2 is defined by side faces of the ceramic plates 4c to 4e. A side face of the wiring base 2 is brought into contact with the positioning surface S such that the wiring base 2 is positioned on an upper face of the lower step portion of the package 4. Meanwhile, the IC chip 3 is provided on an upper face of the upper step portion of the package 4. Since the ceramic plates 4a to 4f are molded by using a die, dimensional accuracy of the positioning surface S is high, so that off-axis sensitivity of the acceleration sensor can be lessened.

Figure 15:
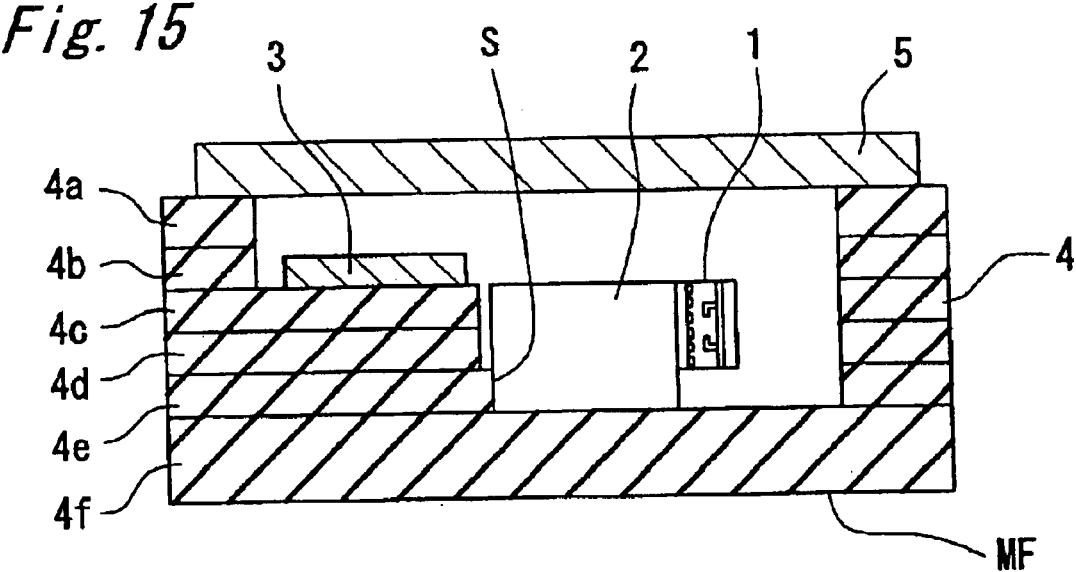
FIG. 15 is a view similar to FIG. 14, particularly showing a first modification of the acceleration sensor of FIG. 14.

FIG. 15 shows an acceleration sensor which is a first modification of the acceleration sensor of FIG. 14. In this acceleration sensor, a side face of the ceramic plate 4e placed on the ceramic plate 4f for supporting the wiring base 2 is projected further horizontally inwardly than those of the ceramic plates 4c and 4d such that the positioning surface S is defined by only the side face of the ceramic plate 4e. In FIG. 15, since only the ceramic plate 4e defines the positioning surface S, the number of the ceramic plates for defining the positioning surface S is reduced to one from three in FIG. 14, it is possible to reduce positioning error of the sensor chip 1 due to erroneous lamination of the ceramic plates for defining the positioning surface S.

Figure 16:
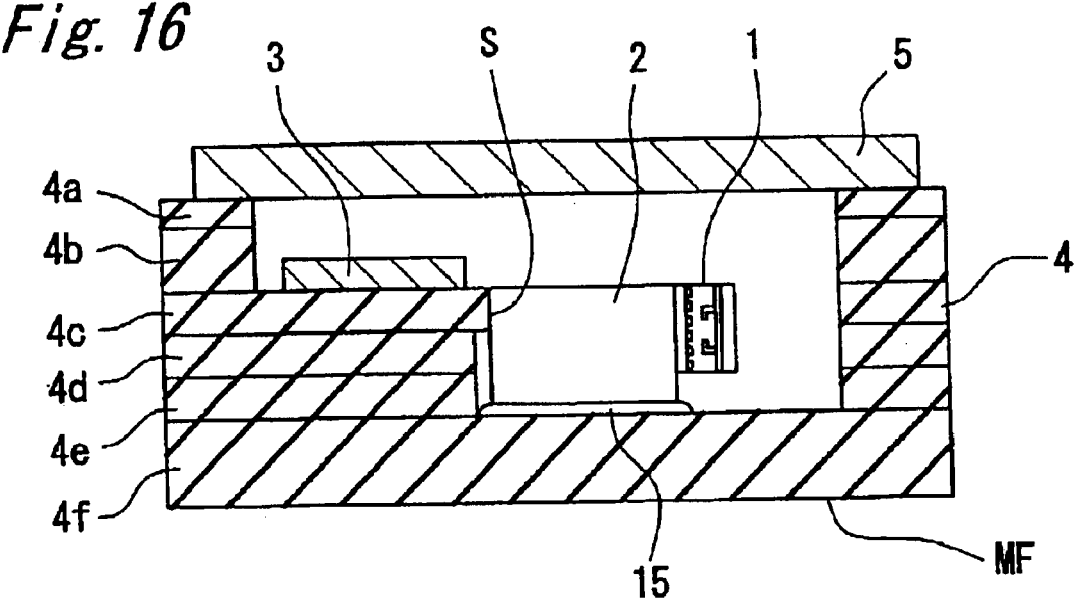
FIG. 16 is a view similar to FIG. 14, particularly showing a second modification of the acceleration sensor of FIG. 14.

FIG. 16 shows an acceleration sensor which is a second modification of the acceleration sensor of FIG. 14. In this acceleration sensor, a side face of the ceramic plate 4c for supporting the IC chip 3 is projected further horizontally inwardly than those of the ceramic plates 4d and 4e such that the positioning surface S is defined by only the side face of the ceramic plate 4c. The wiring base 2 is secured to the ceramic plate 4f by adhesive 15. The adhesive 15 which has oozed out of the ceramic plate 4f and the wiring base 2 is allowed to leak into a space defined among the ceramic plate 4c to 4f and the wiring base 2. Therefore, it is possible to lessen deterioration of characteristics of the acceleration sensor caused by production of stress upon upward creep of the adhesive 15 beyond the ceramic plate 4c.

(Fourth Embodiment)

Figure 17:
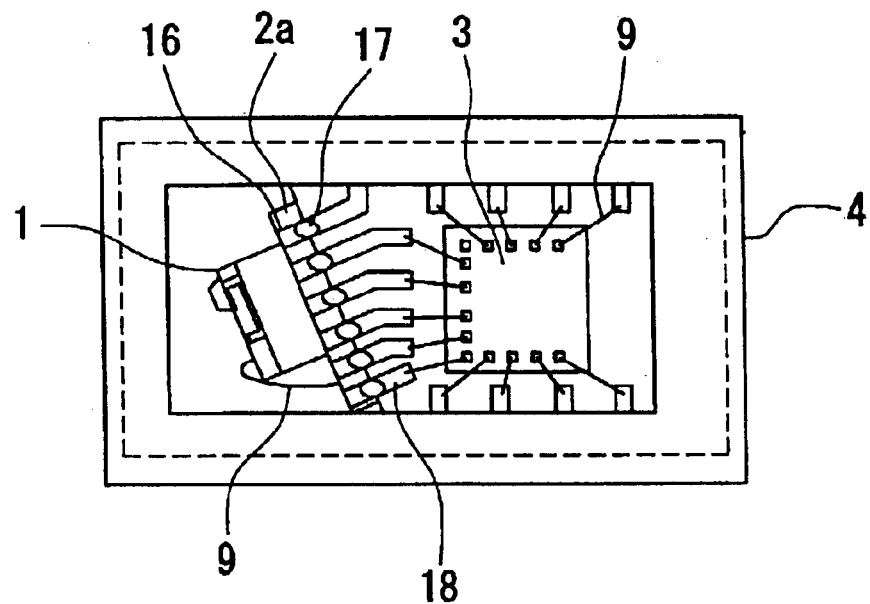
FIG. 17 is a fragmentary top plan view of an acceleration sensor according to a fourth embodiment of the present invention.

FIG. 17 shows an acceleration sensor according to a fourth embodiment of the present invention. In this acceleration sensor, the wiring base 2 in the acceleration sensor of FIG. 1 is replaced by a printed circuit board 2a. Since other constructions of the acceleration sensor are similar to those of the acceleration sensor of FIG. 1, the description is abbreviated for the sake of brevity.

In FIG. 17, the printed circuit board 2a for supporting the sensor chip 1 is provided on an upper face of a bottom wall of the package 4 made of ceramic and the sensor chip 1 is mounted on one face of the printed circuit board 2a. A plurality of through-holes 16 are formed on an upper face of the printed circuit board 2a and a conductive pattern 18 is formed in the package 4. The sensor chip 1 is connected to the conductive pattern 18 of the package 4 by Ag paste 17 via the through-holes 16. The conductive pattern 18 is further connected to the IC chip 3 by the bonding wires 9. Solder may also be used in place of the Ag paste 17.

Figure 18:
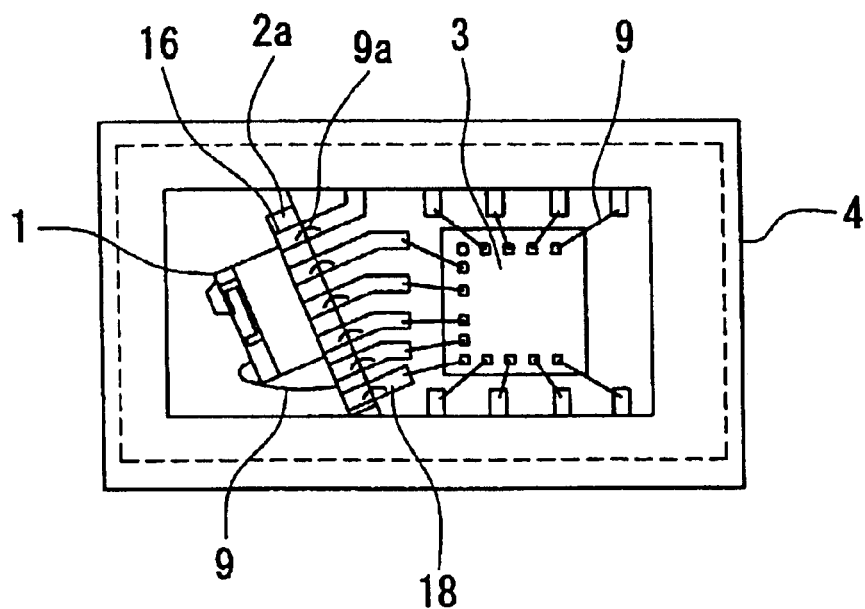
FIG. 18 is a view similar to FIG. 17, particularly showing a modification of the acceleration sensor of FIG. 17.

FIG. 18 shows an acceleration sensor which is a modification of the acceleration sensor of FIG. 17. In this acceleration sensor, the sensor chip 1 is connected to the conductive pattern 18 of the package 4 by bonding wires 9a via the through-holes 16.

Since the through-holes 16 of the printed circuit board 2a can be formed by metallizing in one direction, the printed circuit board 2a can be produced at low cost.

A fixed beam construction of the sensor chip 1 is employed only in the modification (FIG. 13) of the second embodiment but may also be, needless to say, applied to the first, third and fourth embodiments. In this case, the first wire bonding face F1 of the sensor chip 1 is perpendicular to the sensitive axis X as shown in FIG. 13.

As is clear from the foregoing description, the following marked effects (1) to (15) can be gained in the acceleration sensor according to the embodiments of the present invention.

(1) By providing the wiring base between the package and the sensor chip, position and attitude of the first wire bonding face of the sensor chip relative to the package can be set arbitrarily. Meanwhile, since not only the wiring base is mounted on the package such that a difference between heights of the third and fourth wire bonding faces from the board face of the printed circuit board and an angle formed between the third and fourth wire bonding faces are set to small values enabling the wiring pattern on the third wire bonding face of the wiring base to be connected to pads on the fourth wire bonding face of the package but the sensor chip is mounted on the wiring base such that the wiring pattern on the second wire bonding face of the wiring base can be connected to pads on the first wire bonding face of the sensor chip, reliability of wire bonding between the wiring base and the package and between the wiring base and the sensor chip can be secured.

(2) Since the package has a shape of a rectangular box and the mounting face of the package is provided on one of outer faces of the rectangular box other than a specific outer face having a minimum area in the outer faces, undesirable inclination of the sensor chip due to its inaccurate mounting is lessened and thus, off-axis sensitivity of the acceleration sensor can be reduced.

(3) Since the wiring pattern on the second wire bonding face of the wiring base is connected to the pads on the first wire bonding face of the sensor chip by bonding wires, while the wiring pattern on the third wire bonding face of the wiring base is connected to the pads on the fourth wire bonding face of the package by conductive paste or solder, wire bonding between the wiring base and the sensor chip and between the wiring base and the package can be performed stably.

(4) Since the curved lead for transmitting signals between the sensor chip and outside is secured to the printed circuit board and the package, the curved portion of the lead serves to relax stress of the solder so as to secure reliability of the solder.

(5) Since the wiring base is made of resinous material, the wiring base can be molded highly accurately by raising accuracy of a molding die, so that undesirable inclination of the sensor chip due to its inaccurate mounting is further lessened and thus, off-axis sensitivity of the acceleration sensor can be reduced further.

(6) Since the wiring base is made of a material having a coefficient of thermal expansion similar to that of the sensor chip, thermal stress applied between the wiring base and sensor chip is reduced, so that operational reliability of the acceleration sensor can be secured.

(7) Since the sensing element for converting the acceleration into the electrical signal is provided on the first wire bonding face of the sensor chip and the sensitive axis is perpendicular to the first wire bonding face of the sensor chip, the sensor chip of a fixed beam construction can be employed.

(8) Since the sensor chip includes a first substrate formed by a semiconductor substrate and having the first wire bonding face and a second substrate joined to a rear face of the first substrate and has a cantilever construction in which the first substrate is formed with a weight portion, a deflective portion, a support portion and a sensing element, while the deflective portion is formed on the first wire bonding face and has one end coupled integrally with the weight portion, the support portion is integrally coupled with the other end of the deflective portion so as to pivotally support the weight portion via the deflective portion and the sensing element is disposed at the deflective portion and detects a deformation of the deflective portion so as to convert the deformation of the deflective portion into the electrical signal representing the acceleration such that a straight line connecting a center of gravity of the weight portion and a fulcrum of deflection of the deflective portion is perpendicular to the board face of the printed circuit board, stress distribution of the deflective portion and the support portion in the sensor chip of the cantilever type is symmetrical with respect to the straight line connecting the center of gravity of the weight portion and the fulcrum of deflection of the deflective portion, so that off-axis sensitivity of the acceleration sensor is lessened and thus, operational reliability of the acceleration sensor is raised.

(9) Since the package is formed by a plurality of ceramic plates laminated on each other such that lamination faces of the ceramic plates are parallel to the board face of the printed circuit board, the mounting face to be mounted on the board face of the printed circuit board is formed by one of the lamination faces of the ceramic plates and parallelism and flatness of opposite lamination faces of each of the ceramic plates are highly accurate, so that undesirable inclination of the sensor chip due to its inaccurate mounting is lessened and thus, off-axis sensitivity of the sensor chip can be reduced.

(10) Since the opening is formed on one face of the package and is covered by the cap made of metal, the difference in coefficient of thermal expansion between the cap and the package made of ceramic is small, so that reliability of sealing between the cap and the package can be secured and noise shielding performance between the cap and the package can be upgraded.

(11) Since the wiring base is brought into contact with the positioning surface defined by the side faces of the ceramic plates so as to be positioned in the package, off-axis sensitivity of the acceleration sensor can be reduced by bringing the wiring base into contact with the positioning surface finished at a quite high dimensional accuracy.

(12) Since the side face of a portion of the ceramic plates is further projected into the package than those of the remainder of the ceramic plates so as to act as the positioning surface, positioning error of the wiring base due to lamination error of the ceramic plates can be reduced and thus, off-axis sensitivity of the acceleration sensor can be lessened.

(13) Since the wiring base is placed on a specific one of the ceramic plates and at least one of the ceramic plates is interposed between the portion of the ceramic plates and the specific one of the ceramic plates, positioning error of the wiring base due to lamination error of the ceramic plates can be reduced and thus, off-axis sensitivity of the acceleration sensor can be lessened. In addition, when the wiring base is secured to the ceramic plate by the adhesive, the adhesive which has oozed out of the ceramic plate and the wiring base is allowed to leak into the space defined among the ceramic plates and the wiring base, so that it is possible to lessen deterioration of characteristics of the acceleration sensor caused by production of stress due to upward creep of the adhesive.

(14) Since the wiring base is formed by the second printed circuit board having, on its end face, the through-holes and the wiring pattern of the second printed circuit board is connected to the pads of the package by the conductive paste or solder via the through-holes, the through-holes of the second printed circuit board can be formed by metallizing in one direction and thus, the wiring base can be produced at low cost.

(15) Since the wiring base is formed by the second printed circuit board having, on its end face, the through-holes and the wiring pattern of the second printed circuit board is connected to the pads of the package by the bonding wires via the through-holes, the through-holes of the second printed circuit board can be formed by metallizing in one direction and thus, the wiring base can be produced at low cost.

What is claimed is:

1. An acceleration sensor comprising:
    a sensor chip that converts an acceleration applied in a direction of a sensitive axis parallel to a board face of a printed circuit board into an electrical signal, the sensor chip having a first wire bonding face;
    a wiring base that supports the sensor chip, the wiring base including second and third wire bonding faces and a wiring pattern formed on the second and third wire bonding faces; and
    a package that accommodates the wiring base having the sensor chip mounted thereon, the package having a mounting face configured to be mounted on the board face of the printed circuit board and a fourth wire bonding face substantially parallel to the mounting face;
    wherein the wiring base is mounted on the package such that a difference between heights of the third and fourth wire bonding faces from the board face of the printed circuit board and an angle formed between the third and fourth wire bonding faces enable the wiring pattern on the third wire bonding face of the wiring base to be connected to pads on the fourth wire bonding face of the package;
    wherein the sensor chip is mounted on the wiring base such that the wiring pattern on the second wire bonding face of the wiring base can be connected to pads on the first wire bonding face of the sensor chip.

2. An acceleration sensor as claimed in claim 1, wherein the package has a rectangular box shape and the mounting face of the package is provided on one of outer faces of the rectangular box other than an outer face having a minimum area of the outer faces.

3. An acceleration sensor as claimed in claim 1, wherein the wiring pattern on the second wire bonding face of the wiring base is connected to the pads on the first wire bonding face of the sensor chip by bonding wires, and the wiring pattern on the third wire bonding face of the wiring base is connected to the pads on the fourth wire bonding face of the package by one of conductive paste and solder.

4. An acceleration sensor as claimed in claim 1, wherein a curved lead for transmitting signals with the sensor chip and an external circuit is secured to the printed circuit board and the package.

5. An acceleration sensor as claimed in claim 1, wherein the wiring base comprises resinous material.

6. An acceleration sensor as claimed in claim 1, wherein the wiring base comprises a material having a coefficient of thermal expansion similar to that of the sensor chip.

7. An acceleration sensor as claimed in claim 1, wherein a sensing element that converts the acceleration into the electrical signal is provided on the first wire bonding face of the sensor chip and the sensitive axis is perpendicular to the first wire bonding face of the sensor chip.

8. An acceleration sensor as claimed in claim 1, wherein the sensor chip includes a first substrate formed by a semiconductor substrate and having the first wire bonding face and a second substrate joined to a rear face of the first substrate and having a cantilever construction in which the first substrate is formed with a weight portion, a deflective portion, a support portion and a sensing element;
    wherein the deflective portion is formed on the first wire bonding face and has one end coupled integrally with the weight portion, the support portion is integrally coupled with the other end of the deflective portion so as to pivotally support the weight portion via the deflective portion and the sensing element is disposed at the deflective portion and detects a deformation of the deflective portion so as to convert the deformation of the deflective portion into the electrical signal representing the acceleration such that a straight line connecting a center of gravity of the weight portion and a fulcrum of deflection of the deflective portion is perpendicular to the board face of the printed circuit board.

9. An acceleration sensor as claimed in claim 1, wherein the package comprises a plurality of ceramic plates laminated on each other such that lamination faces of the ceramic plates are parallel to the board face of the printed circuit board.

10. An acceleration sensor as claimed in claim 9, wherein an opening is provided on one face of the package and is covered by a metal cap.

11. An acceleration sensor as claimed in claim 9, wherein the wiring base contacts a positioning surface defined by side faces of the ceramic plates and is positioned in the package.

12. An acceleration sensor as claimed in claim 11, wherein a side face of a portion of the ceramic plates is further extends into the package than side faces of the remainder of the ceramic plates so as to act as the positioning surface.

13. An acceleration sensor as claimed in claim 12, wherein the wiring base is placed on a specific one of the ceramic plates and at least one of the ceramic plates is interposed between the portion of the ceramic plates and the specific one of the ceramic plates.

14. An acceleration sensor as claimed in claim 1, wherein the wiring base comprises a second printed circuit board having, on a second printed circuit board end face, through-holes and a wiring pattern, and the second printed circuit board is connected to pads of the package by one of conductive paste and solder via the through-holes.

15. An acceleration sensor as claimed in claim 1, wherein the wiring base comprises a second printed circuit board having, on a second printed circuit board end face, through-holes and a wiring pattern, and the second printed circuit board is connected to the pads of the package by bonding wires via the through-holes.

* * * * *